US008567742B2

(12) United States Patent
Sizelove et al.

(10) Patent No.: US 8,567,742 B2
(45) Date of Patent: Oct. 29, 2013

(54) MOUNTING BRACKET PROTECTION DEVICE

(75) Inventors: J. David Sizelove, Brick, NJ (US); Kevin M. Garbie, Toms River, NJ (US)

(73) Assignee: Aquatherm Industries, Inc., Lakewood, NJ (US)

( * ) Notice: Subject to any disclaimer, the term of this patent is extended or adjusted under 35 U.S.C. 154(b) by 191 days.

(21) Appl. No.: 13/189,323

(22) Filed: Jul. 22, 2011

(65) Prior Publication Data

US 2013/0020455 A1    Jan. 24, 2013

(51) Int. Cl.
*F16M 13/00*    (2006.01)

(52) U.S. Cl.
USPC ............. 248/505; 248/500; 248/680; 24/68 R (58) Field of Classification Search
USPC ................ 248/505, 74.5, 499, 500, 510, 680; 24/135 A, 135 R, 136 R, 136 L, 68 R, 24/301, 478; 206/478; 410/101, 109, 110
See application file for complete search history.

(56) References Cited

U.S. PATENT DOCUMENTS

| 418,369 | A | | 12/1889 | Huff | |
|---|---|---|---|---|---|
| 753,398 | A | | 3/1904 | Hunt | |
| 2,632,217 | A | * | 3/1953 | Flora | 24/16 PB |
| 2,915,267 | A | | 12/1959 | Kaysing | 248/67.5 |
| 3,716,958 | A | | 2/1973 | Scrivener | 52/713 |
| 4,190,989 | A | | 3/1980 | Sakharoff | 52/60 |
| 4,378,616 | A | | 4/1983 | Fischer et al. | 24/245 |
| 4,407,477 | A | | 10/1983 | Backlund et al. | 248/499 |
| 4,502,256 | A | | 3/1985 | Hahn | 52/63 |
| 4,631,887 | A | | 12/1986 | Francovitch | 52/410 |
| 4,727,699 | A | | 3/1988 | Sargent | 52/410 |
| 4,757,662 | A | | 7/1988 | Gasser | 52/410 |
| 4,793,031 | A | * | 12/1988 | Kasai | 24/324 |
| 4,852,323 | A | | 8/1989 | Kartfilt | 52/410 |
| 4,949,523 | A | * | 8/1990 | Kassem | 52/713 |
| 5,164,020 | A | | 11/1992 | Wagner et al. | 136/251 |
| 5,531,049 | A | | 7/1996 | Hirai et al. | 52/200 |
| 5,548,878 | A | * | 8/1996 | Romagnoli | 24/306 |
| 5,590,503 | A | | 1/1997 | Spronken | 52/677 |
| 5,600,971 | A | | 2/1997 | Suk | 52/713 |
| 5,687,535 | A | | 11/1997 | Rohlf | 52/713 |
| 6,039,520 | A | | 3/2000 | Cheng | 410/106 |
| 6,209,767 | B1 | * | 4/2001 | Liou | 224/276 |
| 6,269,596 | B1 | | 8/2001 | Ohtsuka et al. | 52/173.3 |

(Continued)

FOREIGN PATENT DOCUMENTS

| EP | 1 609 928 | 12/2005 |
|---|---|---|
| FR | 1 502 520 | 11/1967 |
| WO | WO 2010/045514 | 4/2010 |

*Primary Examiner* — Anita M King
(74) *Attorney, Agent, or Firm* — James C. Lydon (57) ABSTRACT

A protective device for a mounting bracket suitable for installation of solar collectors. The device includes a U-shaped polymeric base member having a substantially rectangular bottom joined to two opposed upwardly-projecting side walls, the bottom having at least one aperture adapted to receive a mounting fastener capable of attaching the base member to a substrate. A substantially rectangular polymeric cover having substantially the same dimensions as the base member bottom is attached to the base member's side walls. The protective device also includes a metallic mounting bracket adapted to receive a mounting strap. The base member and cover define a partial enclosure having at least one opening through which the mounting strap or a portion of the metallic mounting bracket can pass, and which can retain and protect sealant placed over the mounting fastener.

7 Claims, 6 Drawing Sheets

(56) References Cited

U.S. PATENT DOCUMENTS

| | | | |
|---|---|---|---|
| 6,360,491 B1 | 3/2002 | Ullman | 52/22 |
| 6,416,265 B1 | 7/2002 | Flores et al. | 410/106 |
| 6,672,018 B2 | 1/2004 | Shingleton | 52/173.3 |
| 7,378,816 B2 | 5/2008 | Mayhew | 318/727 |
| 7,481,610 B1 | 1/2009 | Egigian | 410/106 |
| 7,797,906 B2 | 9/2010 | Kassem | 52/713 |
| 7,805,891 B2 | 10/2010 | Lozier et al. | 52/23 |
| 8,302,265 B1 * | 11/2012 | Gretz | 24/135 A |

* cited by examiner

MOUNTING BRACKET PROTECTION DEVICE

BACKGROUND OF THE INVENTION

The present invention relates to an improved method of mounting devices, such as solar collectors, and television and/or satellite antennae, to a support structure which requires a sealed penetration such as a roof. Such devices are commonly mounted using mounting brackets of various materials and designs. However, water damage can occur if the roof penetration for the bracket is poorly sealed and/or if exposed sealant subsequently degrades from exposure to the elements.

Current mounting brackets are typically either metallic or plastic and are directly secured to a roof or support structure using screws or through-bolts. Metallic mounting brackets can suffer corrosion due to exposure to the elements. Even if no leakage occurs, the appearance of the roof can be degraded by streaking due to rusting of a metallic fastening device. Those metallic brackets which are made from two or more dissimilar metals can additionally suffer from galvanic corrosion.

A bracket made entirely of plastic is not inherently as strong as a metallic mounting bracket. Accordingly, the number of plastic mounting brackets required to mount a given device may be greater than the number of required metallic brackets, which increases the number of roof penetrations required to mount the device. A mounting bracket made entirely of plastic may also degrade from ultraviolet exposure over time, thereby weakening and possibly leading to premature failure.

U.S. Pat. No. 2,915,267 disclose a wire holder for holding wires or cables in place along a panel or wall in which the wire is clamped in place between ribs projecting from side walls of a base member and a substantially U-shaped top member adapted to be pressed down upon the base member.

U.S. Pat. No. 4,407,477 discloses a tiedown fastening device adapted to fasten a section of a strap or cord placed between a base of the device and a disengageable cap. The strap is held between confronting surface segments cooperating with one another along a path having a plurality of bends, with at least some of the confronting surface segments having confronting stepped shoulders for gripping the strap segment.

SUMMARY OF THE INVENTION

An advantage of the present invention is that it provides a contained area for sealant placed over the mounting penetration, and thus protects the sealant from ultraviolet damage. The contained area may preferably have one or more drainage channels to facilitate removal of any moisture which may be present either from the elements or condensation.

Another advantage of the present invention is that it includes a metallic mounting bracket which is considerably stronger than a plastic mounting bracket. This, in turn, permits a reduction in the number of mounting penetrations in comparison to a plastic mounting bracket.

Still another advantage of the present invention is that it can include at least one discrete, downwardly-oriented projection ("standoff") which space the bottom surface of the base member from the substrate, and thus allow a continuous mass of sealant to be injected or otherwise located/formed in the substrate penetration, under the mounting bracket protection device, and extending into the partial enclosure of the mounting protection and over the fastener.

Yet another advantage of the present invention is that it provides an enlarged polymeric base for better sealing and stability without an increase in cost that would normally be associated with a corrosion resistant metal.

These and other advantages are realized by the present invention which, in one aspect, relates to a mounting bracket protection device, comprising a U-shaped polymeric base member comprising a substantially rectangular bottom joined to two opposed, upwardly-projecting side walls, said bottom having at least one aperture adapted to receive a mounting fastener capable of anchoring said base member to a substrate, a substantially rectangular polymeric cover having substantially the same dimensions as said substantially rectangular bottom and adapted to be attached to said opposed side walls of said base member, such that the bottom, opposed side walls and cover, when attached in a closed position, define a partial enclosure having at least one opening, a metallic mounting bracket having at least one aperture adapted to receive said mounting fastener such that said mounting bracket can be fastened to said bottom with said mounting fastener, said metallic mounting bracket being adapted to receive a mounting strap, such that said partial enclosure has at least one opening which permits passage of either a mounting strap or a portion of the metallic mounting bracket, such that said partial enclosure is suitable for retaining and protecting sealant placed over said mounting fastener.

DETAILED DESCRIPTION OF THE PREFERRED EMBODIMENTS

The device includes a U-shaped polymeric base member adapted to be securely attached to a support structure which requires a sealed penetration, for example a roof or independent rack. More particularly, the U-shaped base member has a substantially rectangular bottom joined to two opposed, upwardly-projecting side walls, with the bottom having least one aperture adapted to receive a mounting fastener. In one preferred embodiment, the bottom of the U-shaped base member has two apertures to ensure the orientation of the mounting protection device does not change once mounted to a substrate such as a roof. The aperture(s) may be countersunk to ensure the fastener does not interfere with the metallic mounting bracket or mounting strap discussed below.

The U-shaped base member may be manufactured from any suitable polymer such as polyolefin and polyamide. Polypropylene and polyethylene are preferred polyolefins. The base member may be manufactured using conventional techniques well known to those of ordinary skill in the art, such as, for example, injection molding.

A substantially rectangular, polymeric protective cover having substantially the same dimensions as the bottom of the substantially rectangular U-shaped base member is adapted to be attached to the opposed, upwardly-projecting side walls of the base member. The base member and the protective cover form a partial enclosure which can retain and protect sealant placed over a mounting fastener extending through the aperture. The partial enclosure also permits passage of either a mounting strap or a portion of a metallic mounting bracket through at least one end of the mounting bracket protection device.

In one embodiment, the protective cover is pivotably attached to one of the base member's opposed side walls, such that the protective cover can pivot from an open position to the closed position. In the open position, the interior of the base member is exposed, which permits anchoring of the base member onto a substrate such as a roof. The cover may be held in the closed position by conventional fastening techniques. For example, the cover may have one or more pins or tabs which can be inserted into holes located on the opposite side wall of the base member.

In another embodiment, the protective cover can slide from an open position to the closed position by means of opposed, parallel channels located near the top surface of the opposed side walls of the base member. The channels may be open on both ends or, alternatively, may be closed on one end to provide positive location of the cover in the closed position.

In yet another embodiment, the cover has two opposed downwardly-projecting side walls which fit over the upwardly projecting side walls of the base member. The cover may be placed in the closed position by simply pressing it down upon the base member side walls to ensure a friction fit. Alternatively, the cover may be slid into the closed position using by engaging pins or tabs inwardly projecting from the cover side walls and cooperating channels located on the outside of the base member side walls. In still another embodiment, tabs can project outwardly from the side walls, and cooperating holes may be located in the cover's side walls.

The U-shaped base member's bottom is sized so as to permit a suitable metallic mounting bracket to be placed thereon. The mounting bracket has at least one aperture adapted to receive a mounting fastener. Preferably, the base member's aperture has the same diameter as the mounting bracket aperture such that the same mounting fastener can pass through both apertures, and thereby securely attach both the mounting bracket and the base member to an underlying substrate such as a roof.

The metallic mounting bracket is adapted to receive amounting strap which may be used to secure devices such as solar panels and television and/or satellite antenna. Such mounting straps are typically made of flexible metal or plastic, and are well known to those of ordinary skill in the art. For example, galvanized stainless steel strapping having various widths is commercially available from Uline.

In one embodiment, the mounting bracket protection device has a terminal metallic mounting bracket adapted to immobilize one end of the mounting strap in position so that it cannot move. In this terminal metallic mounting bracket embodiment, the partial enclosure has one opening which permits passage of a portion of the metallic mounting bracket.

In another embodiment, the mounting bracket protection device has an intermediate metallic mounting bracket which may or may not immobilize the mounting strap. In this intermediate metallic mounting bracket embodiment, the partial enclosure has two opposed openings which allow the mounting strap to pass through both opposed ends of the mounting bracket protection device. In a "floating" embodiment, the metallic bracket supports but does not immobilize the strap, thereby allowing the strap some freedom of movement. This is especially important when the strap is metallic and subject to significant temperature variation over the course of its service lifetime, which can expand and contract the strap. This freedom of movement also permits convenient removal of the mounting strap by simply pulling it through the mounting bracket. In a "fixed embodiment", the metallic bracket immobilizes the strap, which can ensure proper tension on the mounting strap is maintained.

The mounting strap may be immobilized by conventional fasteners well known to those of ordinary skill in the art. A strap clamp immobilizes the mounting strap by first looping the strap through an aperture in the mounting bracket and then clamping one section of mounting strap to another by means of a screw. The strap clamp is preferred because it can be reused. Another known mounting strap fastener is an open metal seal, which is placed over two opposed portions of the mounting strap and crimped, thereby immobilizing the mounting strap in place. However, the open metal seal can only be used once. Yet another known mounting strap fastener is a buckle type clamp suitable for plastic mounting straps.

The mounting bracket protection device may be joined to a roof or other structure by conventional fasteners such as screws, bolts or nails which extend through the aperture(s) of the base member. The fastener may include a standoff which maintains a fixed distance or space between the base member and the substrate, and thus allow a continuous mass of sealant to be injected or otherwise located/formed in the substrate penetration, under the mounting bracket protection device, and extending into the partial enclosure of the mounting protection and over the fastener.

Figure 1:
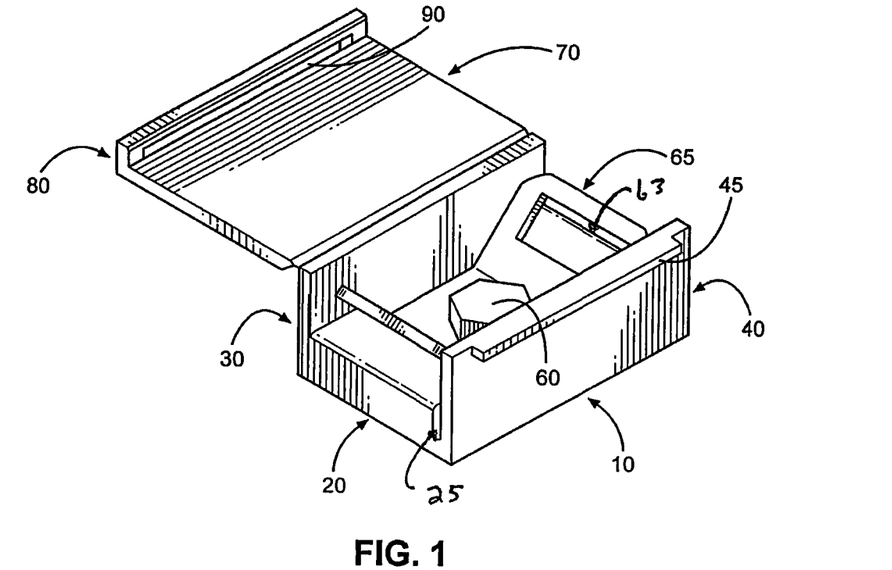
FIG. 1 is a plan view of an intermediate metallic mounting bracket embodiment of the mounting bracket protection device of the present invention in an open position.

FIG. 1 illustrates an intermediate mounting embodiment of the mounting bracket protection device of the present invention. U-shaped polymeric base member 10 comprises a substantially rectangular bottom 20 joined to two opposed, upwardly-projecting side walls 30 and 40. Substantially rectangular bottom 20 may optionally have a cut-out 25 adjacent side wall 40, which aids in water drainage and also imparts flexibility to side wall 40, which is helpful when closing the cover 70 of the mounting bracket protection device.

Side wall 40 has tab 45 projecting from a portion of its top surface. Base member 10 has an aperture 50 which has been countersunk to receive lag bolt 60 which anchors base member 10 and bracket 65 to a substrate (not shown). Mounting bracket 65 includes rectangular-shaped apertures 63 adapted to permit passage of a mounting strap therethrough.

One side of substantially rectangular polymeric cover 70 is joined to side wall 30. The opposite side of cover 70 has side wall 80 projecting therefrom, with sidewall 80 having cut-out 90 extending along the most of its length.

Figure 2:
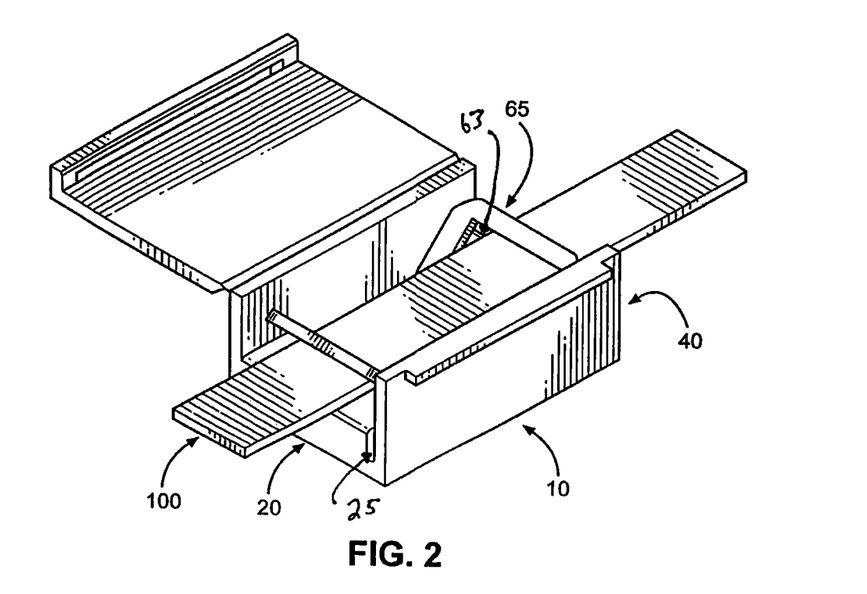
FIG. 2 illustrates the mounting bracket protection device of FIG. 1, further illustrating a portion of a mounting strap threaded through a metallic mounting bracket.

FIG. 2 is another plan view of the intermediate mounting bracket protection device of FIG. 1, further illustrating a portion of a mounting strap 100 threaded through apertures 63 of metallic mounting bracket 65.

Figure 3:
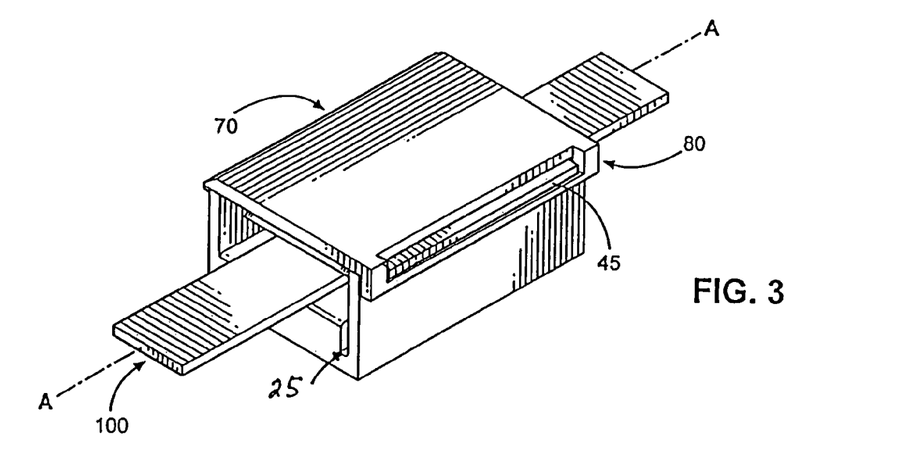
FIG. 3 illustrates the mounting bracket protection device of FIG. 2 in a closed position.

FIG. 3 illustrates the intermediate mounting bracket protection device of FIG. 2 in the closed position, in which cover 70 has been pressed against side 40, such that tab 45 occupies cut-out 90 of side wall 80.

Figure 4:
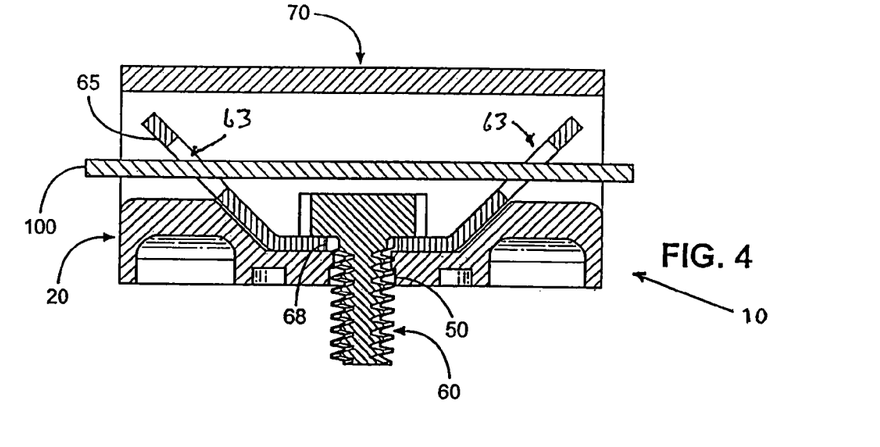
FIG. 4 is a cross-section of the mounting bracket protection device of FIG. 3.

FIG. 4 is a cross-section of the intermediate mounting bracket protection device of FIG. 3 taken through line A-A, and illustrates how lag bolt 60 extends through aperture 68 of metallic bracket 65 and aperture 50 of bottom 20 to anchor base member 10 to a substrate (not shown), while mounting strap 100 passes through apertures 63 of metallic mounting bracket 65.

Figure 5:
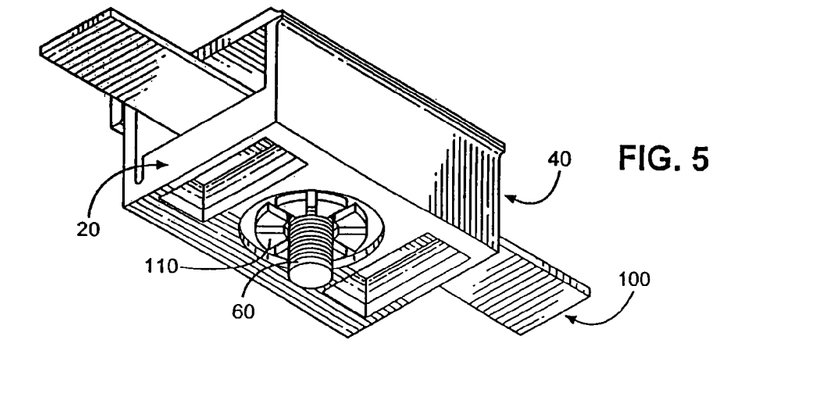
FIG. 5 is a bottom view of the mounting bracket protection device of FIG. 3.

FIG. 5 is a bottom view of the intermediate mounting bracket protection device of FIG. 3, which illustrates lag bolt 60 in combination with standoff 110.

Figure 6:
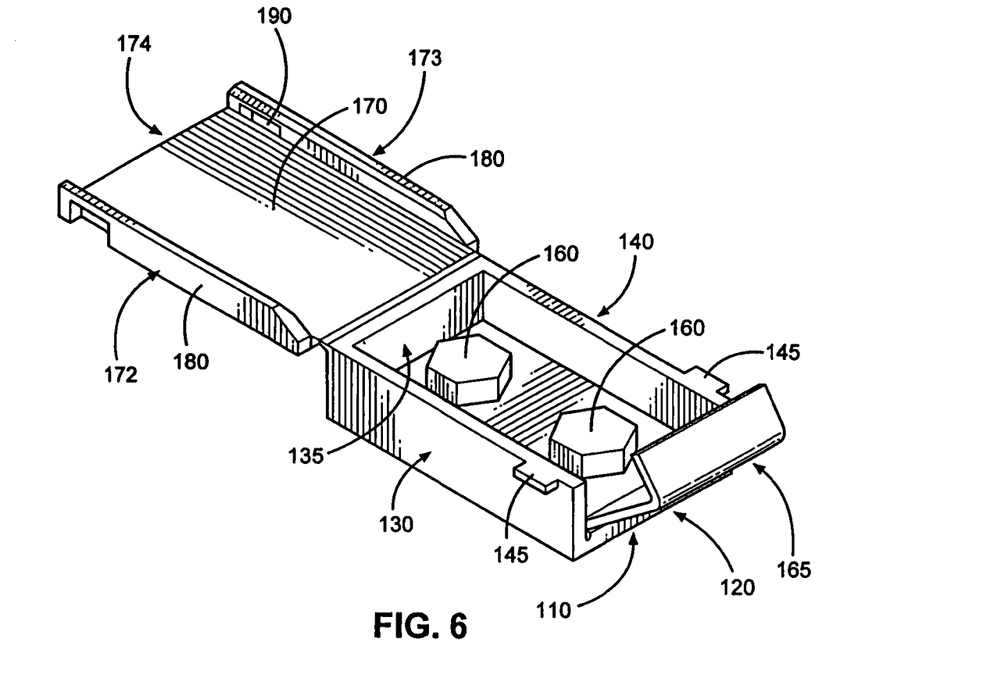
FIG. 6 is a plan view of a terminal metallic mounting bracket embodiment of the mounting bracket protection device of the present invention in an open position.

FIG. 6 illustrates a terminal mounting embodiment of the mounting bracket protection device of the present invention. U-shaped polymeric base member 110 comprises a substantially rectangular bottom 120 joined to two opposed, upwardly-projecting side walls 130 and 140 and upwardly-projecting end wall 135. Side walls 130 and 140 have tabs 145 outwardly-projecting from a portion of their top surface distal from end wall 135.

One side of substantially rectangular polymeric cover 170 is joined to end wall 135. Opposing sides 172 and 173 of cover 170 each have a side wall 180 projecting therefrom, with side walls 180 each having a cut-out 190 located near opposite edge 174 of cover 170.

Figure 7:
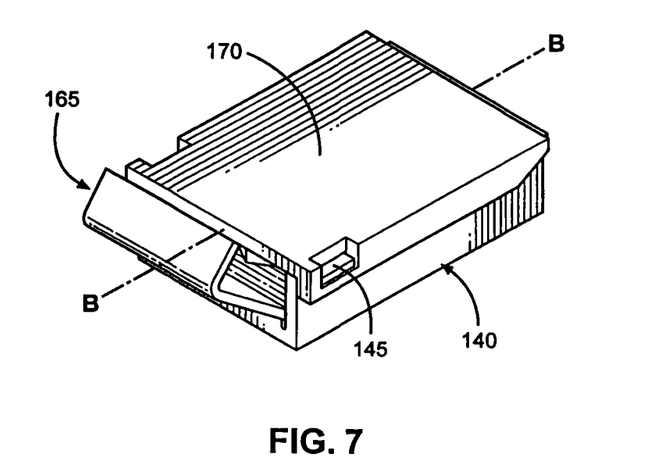
FIG. 7 is another plan view of a terminal metallic mounting bracket embodiment of the mounting bracket protection device of the present invention in the closed position.

FIG. 7 is a plan view of the terminal mounting bracket protection device of FIG. 6 in the closed position, in which cover 170 has been pressed towards side 145, and tabs 145 occupy cut-outs 190 of side walls 180.

Figure 8:
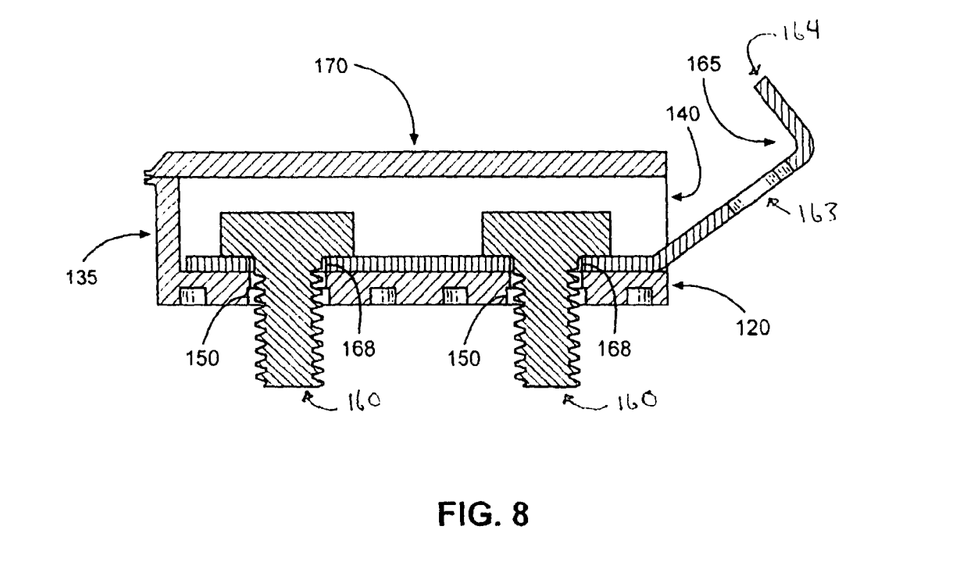
FIG. 8 is a cross-section of the mounting bracket protection device of FIG. 7.

FIG. 8 is a cross-section of the terminal mounting bracket protection device of FIG. 7 taken through line B-B, and illustrates how lag bolts 160 extend through apertures 168 of metallic bracket 165 and apertures 150 of bottom 120 to anchor mounting bracket protection device 110 to a substrate (not shown). FIG. 8 additionally illustrates aperture 163 and end 164 of metallic mounting bracket 165.

Figure 9:
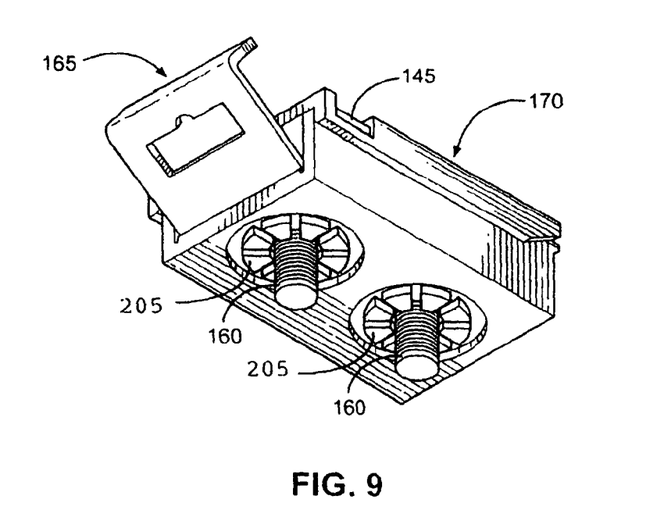
FIG. 9 is a bottom view of the mounting bracket protection device of FIG. 7.

FIG. 9 is a bottom view of the terminal mounting bracket protection device of FIG. 7, which illustrates lag bolts 160 in combination with standoffs 205.

As shown in FIGS. 6-9, a portion of metallic mounting bracket 165 passes through the opening of the partial enclosure formed by the U-shaped base member 110 and cover 170. Mounting strap 100 does not enter the partial enclosure, as is illustrated in FIGS. 10-13, discussed below.

Figure 10:
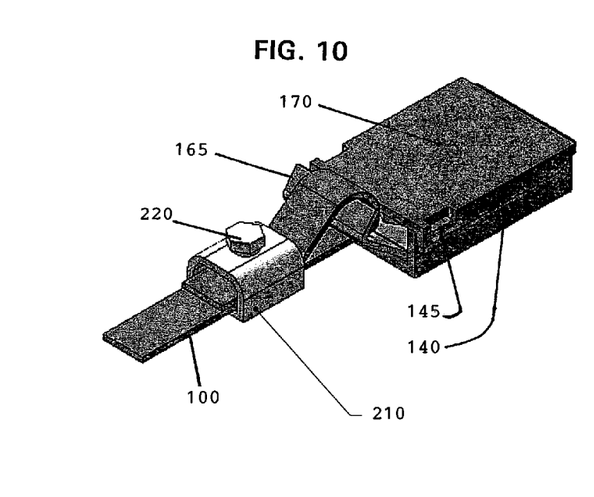
FIG. 10 illustrates the same mounting bracket protection device illustrated in FIG. 7, with the addition of a mounting strap and strap clamp attached thereto.

FIG. 10 illustrates the same mounting bracket protection device illustrated in FIG. 7, with the addition of a mounting strap and strap clamp attached thereto. Thus, FIG. 10 is a plan view of the terminal mounting bracket protection device of FIG. 6 in the closed position, in which tabs 145 occupy cut-outs 190 of side walls 180. In addition, FIG. 10 illustrates mounting strap 100, which has been threaded through mounting bracket 165 and folded back upon itself. Strap clamp 210 immobilizes mounting strap 100 by means of bolt 220.

Figure 11:
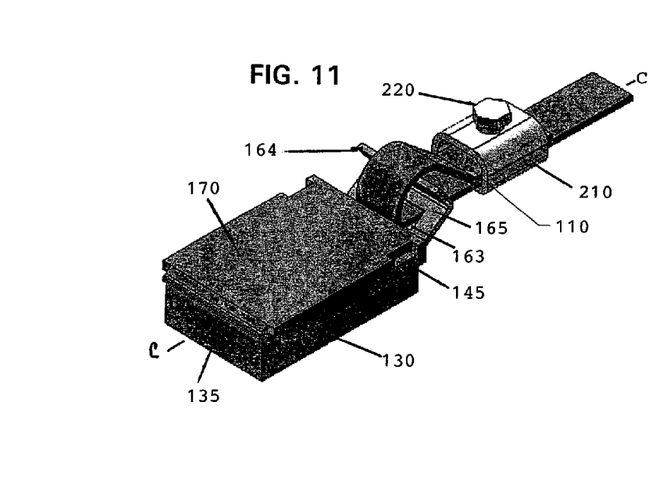
FIG. 11 is another plan view of the mounting bracket protection device shown in FIG. 10.

FIG. 11 is another plan view of the mounting bracket protection device shown in FIG. 10, and illustrates how mounting strap 100 passes through aperture 163 of mounting bracket 165 and over end 164 of mounting bracket 165.

Figure 12:
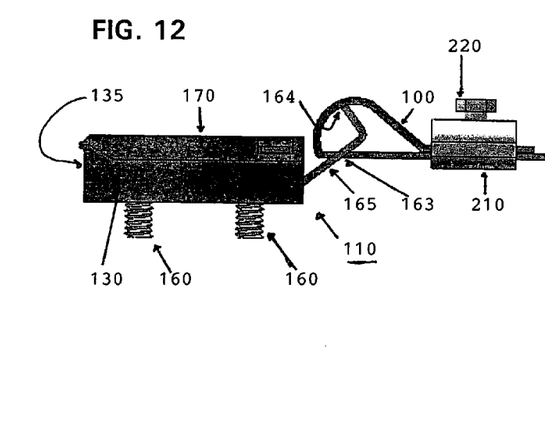
FIG. 12 is a side view of the mounting bracket protection device shown in FIG. 11.

FIG. 12 is a side view of the mounting bracket protection device shown in FIG. 11, and provides additional illustration of the closed terminal mounting bracket protection device with mounting strap 100 attached by means of strap clamp 210. This side view additionally illustrates lag bolts 160 extending from U-shaped base member 110, and how mounting bracket 165 engages mounting strap 100 both at aperture 163 and at end 164.

Figure 13:
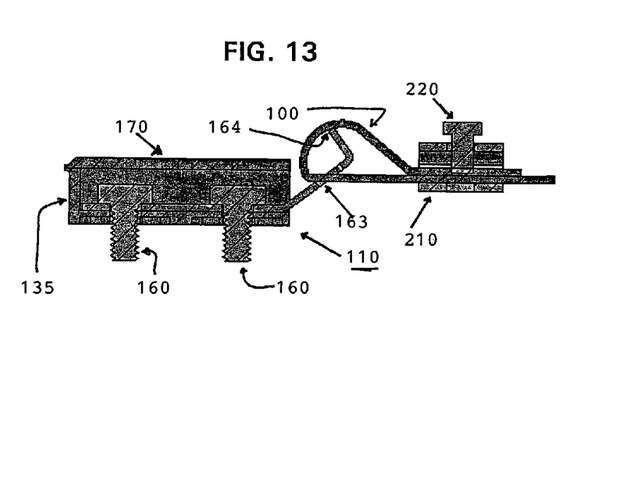
FIG. 13 is a cross-section of the mounting bracket protection device shown in FIG. 11, taken along line C-C.

FIG. 13 is a cross-section of the mounting bracket protection device shown in FIG. 11, taken along line C-C, and additionally illustrates how mounting strap 100 is clamped to itself by passage through strap clamp 210.

Figure 14:
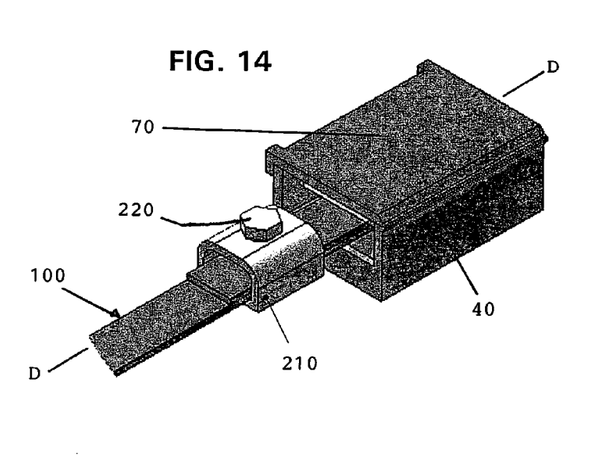
FIG. 14 illustrates the same mounting bracket protection device illustrated in FIG. 3, with the addition of a mounting strap and strap clamp attached thereto.
Figure 15:
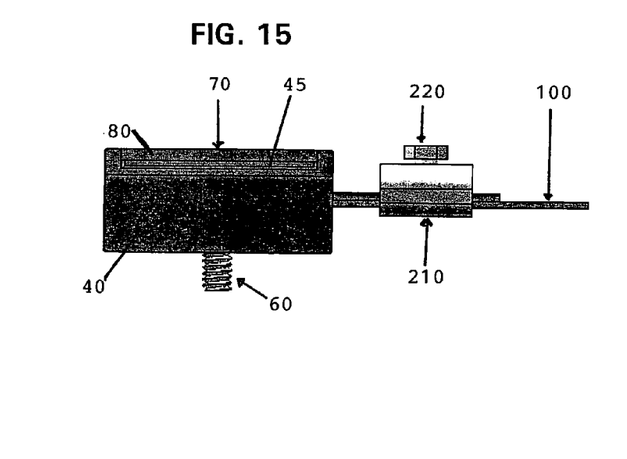
FIG. 15 is a side view of the mounting bracket protection device shown in FIG. 14.
Figure 16:
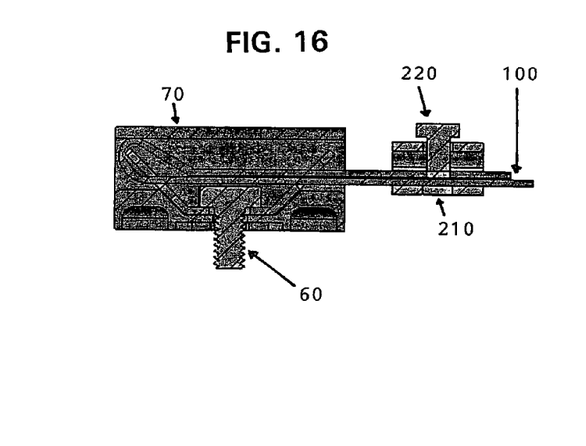
FIG. 16 is a cross-section of the mounting bracket protection device shown in FIG. 14, taken along line D-D.

FIGS. 14-16 illustrate the "fixed" intermediate embodiment of the mounting bracket protection device, in which the device is used to immobilize a mounting strap. Thus, FIG. 14 illustrates the same intermediate mounting bracket protection device illustrated in FIG. 3, with the addition of mounting strap 100 attached via strap clamp 220. As shown therein, mounting strap 100 passes into and out of the same end of the mounting protection device.

FIG. 15 is a side view of the mounting bracket protection device shown in FIG. 14, while FIG. 16 provides more detail as to how mounting strap 100 passes through both apertures 163 of mounting bracket 165, is bent around one end 164 of mounting bracket 165, and then passes through the first aperture 163 prior to exiting the device and being clamped by strap clamp 210.

Typically, a plurality of spaced-apart brackets will be used to anchor a device such as a solar collector or a television and/or satellite antenna. The location of each mounting bracket is determined by reference to the device and its desired location on the roof or other substrate.

In one preferred embodiment, a hole is drilled into the substrate at each desired location. A mounting bracket base member is placed over the location so that the hole and the base member aperture are aligned. The mounting bracket is then placed over the base member so that the bracket's aperture is aligned with the base member's aperture and the substrate hole. The mounting bracket and the base member are then anchored to the substrate by passing a fastener such as a lag bolt or screw through their apertures into the substrate hole. Preferably, the base member is aligned so that its two opposed openings are directed horizontally rather than vertically, so that rainwater cannot flow through the mounting protection device.

Sealant is applied to and over the fastener after the base and metallic mounting members are secured in the desired position. The sealant may be conveniently any sealant typically used to secure roof mountings, such as RTV silicone, polyurethane, polyester and butyl rubber sealants.

A mounting strap attached to the device to be secured is then threaded through the metallic mounting bracket and clamped into position. The protective cover is then closed, thereby protecting the mounting bracket, the sealant and the underlying fastener from direct exposure to the elements, such as sun, wind, rain, hail and snow. The sealant will not age as quickly due to this protection. Moreover, the aesthetic appearance of a substrate such as a roof is improved in comparison to a plurality of exposed, sealant-covered fasteners, which can discolor due to weathering over time. Moreover, rusting of metallic fasteners due to weathering should be significantly reduced if not eliminated.

The invention claimed is:

1. A mounting bracket protection device, comprising
   a U-shaped polymeric base member comprising a substantially rectangular bottom joined to two opposed, upwardly-projecting side walls, said bottom having at least one aperture adapted to receive a mounting fastener capable of anchoring said base member to a substrate,
   a substantially rectangular polymeric cover having substantially the same dimensions as said substantially rectangular bottom and adapted to be attached to said opposed side walls of said base member, such that the bottom, opposed side walls and cover, when attached in a closed position, define a partial enclosure having at least one opening,
   a metallic mounting bracket having at least one aperture adapted to receive said mounting fastener such that said mounting bracket can be fastened to said bottom with said mounting fastener, said metallic mounting bracket being adapted to receive a mounting strap,
   such that said partial enclosure permits passage of said mounting strap or a portion of said metallic mounting bracket through said at least one opening, and
   such that said partial enclosure is suitable for retaining and protecting sealant placed over said mounting fastener.

2. The mounting bracket protection device of claim 1, wherein said cover is pivotably joined to one of the opposed side walls of the base member, such that said cover can pivot from an open position to a closed position.

3. The mounting bracket protection device of claim 2, wherein the base member is attached to said cover by an integral hinge.

4. The mounting bracket protection device of claim 1, wherein said cover slides from an open position into said closed position.

5. The mounting bracket protection device of claim 1, wherein said metallic mounting bracket is a terminal mounting bracket adapted to immobilize one end of said mounting strap in position.

6. The mounting bracket protection device of claim 1, wherein said metallic mounting bracket is an intermediate metallic mounting bracket adapted to support, but not immobilize, said mounting strap which passes through said partial enclosure.

7. The mounting bracket protection device of claim 1, wherein said metallic mounting bracket is an intermediate metallic mounting bracket adapted to immobilize said mounting strap which passes through said partial enclosure.

* * * * *